US011098395B2

(12) United States Patent
Arnett et al.

(10) Patent No.: US 11,098,395 B2
(45) Date of Patent: Aug. 24, 2021

(54) NICKEL-BASED SUPERALLOY WITH MICROSTRUCTURE INCLUDING RAFTING-RESISTANT GAMMA PRIME PHASE AND ARTICLE PREPARED THEREFROM

(71) Applicant: General Electric Company, Schenectady, NY (US)

(72) Inventors: Michael Douglas Arnett, Simpsonville, SC (US); Jon Conrad Schaeffer, Greenville, SC (US); Arthur Samuel Peck, Greer, SC (US); Maxim Konter, Klingnau (CH)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/718,797

(22) Filed: Dec. 18, 2019

(65) Prior Publication Data
US 2021/0189539 A1 Jun. 24, 2021

(51) Int. Cl.
*C22C 19/03* (2006.01)
*C22C 19/05* (2006.01)
(Continued)

(52) U.S. Cl.
CPC ............ *C22F 1/10* (2013.01); *C22C 19/03* (2013.01); *C22C 19/05* (2013.01); *C22C 19/051* (2013.01);
(Continued)

(58) Field of Classification Search
CPC . C22F 1/00; C22F 1/10; C22C 19/057; C22C 19/03; C22C 19/05; C22C 19/051;
(Continued)

(56) References Cited

U.S. PATENT DOCUMENTS

| 4,574,015 A | 3/1986 | Genereux et al. |
| 5,328,659 A * | 7/1994 | Tillman ................ C22C 19/056 148/410 |

(Continued)

FOREIGN PATENT DOCUMENTS

| BE | 901393 A | 4/1985 |
| EP | 0434996 A1 | 7/1991 |

(Continued)

OTHER PUBLICATIONS

EP Search Report for corresponding European Patent Application No. 20211377.5 dated Feb. 12, 2021, 13 pages.
(Continued)

*Primary Examiner* — Michael E. La Villa
(74) *Attorney, Agent, or Firm* — Hoffman Warnick LLC

(57) ABSTRACT

In a non-limiting example, an article having a body including a nickel-based superalloy is provided. The nickel-based superalloy has a microstructure that includes a gamma phase matrix and a gamma prime phase including a plurality of rafting-resistant gamma prime particles dispersed in the gamma phase matrix. The plurality of the rafting-resistant gamma prime particles has an average particle perimeter of about 3 microns to about 15 microns, an average aspect ratio of about 1.2 to about 3, and where the microstructure of the nickel-based superalloy is substantially uniform throughout the body.

11 Claims, 10 Drawing Sheets

(51) Int. Cl.
*F01D 5/28* (2006.01)
*C22F 1/10* (2006.01)
*C22F 1/00* (2006.01)

(52) U.S. Cl.
CPC .......... *C22C 19/057* (2013.01); *C22C 19/058* (2013.01); *C22F 1/00* (2013.01); *F01D 5/282* (2013.01); *F01D 5/28* (2013.01); *F05D 2300/175* (2013.01); *Y10T 428/12931* (2015.01); *Y10T 428/12937* (2015.01); *Y10T 428/12944* (2015.01)

(58) Field of Classification Search
CPC ......... C22C 19/058; F01D 5/28; F01D 5/282; F05D 2300/175; Y10T 428/12931; Y10T 428/12937; Y10T 428/12944
See application file for complete search history.

(56) References Cited

U.S. PATENT DOCUMENTS

| | | | |
|---|---|---|---|
| 5,529,643 | A | 6/1996 | Yoon et al. |
| 8,226,886 | B2 | 7/2012 | Hanlon et al. |
| 10,253,396 | B2 | 4/2019 | Schaeffer et al. |
| 2003/0041930 | A1* | 3/2003 | DeLuca ................ C22C 19/057 148/556 |

FOREIGN PATENT DOCUMENTS

| | | |
|---|---|---|
| EP | 3277853 | 2/2018 |
| EP | 3351651 A1 | 7/2018 |
| EP | 3412785 A1 | 12/2018 |
| WO | 2018111566 A1 | 6/2018 |

OTHER PUBLICATIONS

D.U. Furrer et al., "Forging of Nickel-Base Alloys," published 2005, ASM Handbook, vol. 14A: Metalworking: Bulk Forming, pp. 324-330.

D. D. Krueger, "The Development of Direct Age 718 for Gas Turbine Engine Disk Applications," The Minerals, Metals & Materials Society, 1989, pp. 279-296.

* cited by examiner

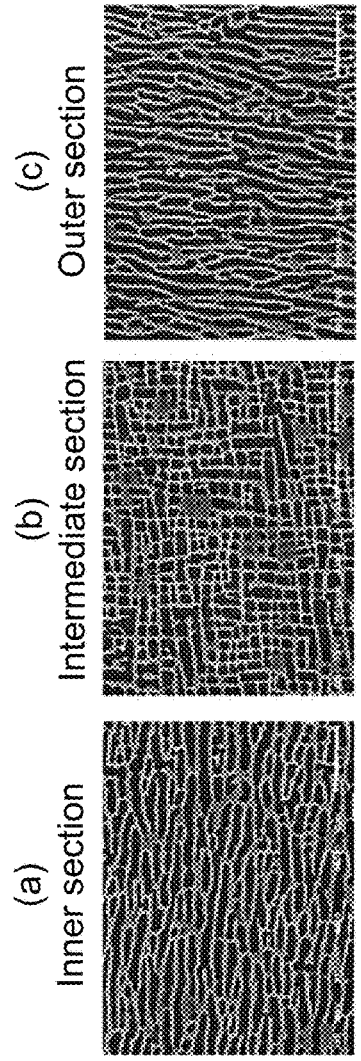
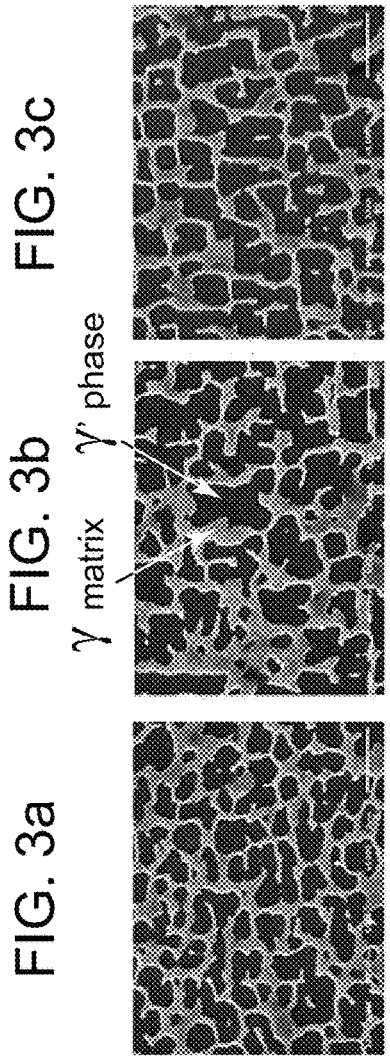
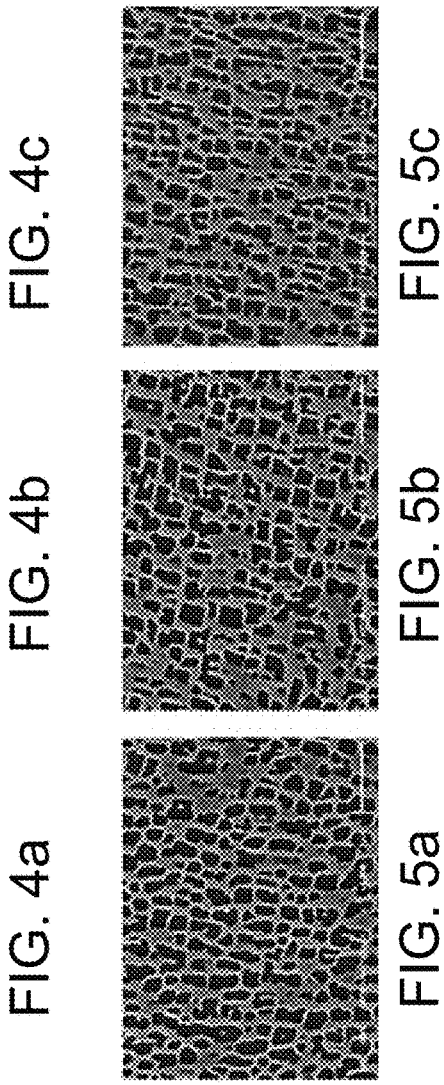

NICKEL-BASED SUPERALLOY WITH MICROSTRUCTURE INCLUDING RAFTING-RESISTANT GAMMA PRIME PHASE AND ARTICLE PREPARED THEREFROM

TECHNICAL FIELD

The present disclosure relates generally to a nickel-based superalloy and an article prepared therefrom. More specifically, the disclosure relates to a nickel-based superalloy with a microstructure including a rafting-resistant gamma prime phase and an article prepared therefrom.

BACKGROUND

Due to their high strength under high temperature operating environments, nickel (Ni)-based superalloys have been widely used in manufacturing various industrial components including, but not limited to, gas turbine parts, engine members for aircraft, chemical plant materials, turbocharger rotors for automobiles, and high temperature furnace materials. Ni-based superalloys typically have a microstructure including a gamma ($\gamma$) phase and a gamma prime ($\gamma'$) phase. The $\gamma$ phase may serve as a matrix for the $\gamma'$ phase and may be referred to as a $\gamma$ matrix. In the $\gamma'$ phase, a plurality of gamma prime particles ("$\gamma'$ particles") or precipitates may be dispersed in the $\gamma$ matrix. It is generally recognized that the $\gamma'$ phase is largely responsible for the high strength of Ni-based superalloys under elevated temperatures, with a higher volume fraction or volume percent of the $\gamma'$ phase in the Ni-based superalloys typically being associated with higher strengthening effects of the Ni-based superalloys.

Despite their attractive properties, Ni-based superalloys, especially the ones with a single-crystal grain microstructure (e.g., single crystal nickel-based superalloys), may be susceptible to crack growth or rafting. For example, industrial components formed from Ni-based superalloys may experience crack growth, fracture or rafting under certain operating conditions, leading to operation failure, significant maintenance, and/or repair costs. The challenges become even more severe in applications that involve certain heavy components, for example, gas turbine blades that may weigh up to 25 kg/55 lbs. Such heavy components are more difficult to be heat-treated uniformly, making them more susceptible to crack growth compared to components that weigh much less, e.g., aircraft engine components, thus limiting the choice of Ni-based superalloys used in applications involving certain heavy components.

A conventional approach to minimize the crack growth of a Ni-based superalloy and an article prepared therefrom is to reduce the volume fraction of the $\gamma'$ phase in the Ni-based superalloy. However, this approach carries a consequence of sacrificing the strengthening effect of the $\gamma'$ phase in the Ni-based superalloys.

SUMMARY

A first aspect in accordance with the present disclosure provides an article including: a body having a first side wall, a second side wall opposite to the first side wall, and a body dimension extending between the first side wall and the second side wall, the body further including a nickel-based superalloy having a microstructure that includes: a gamma phase matrix, and a gamma prime phase including a plurality of rafting-resistant gamma prime particles dispersed in the gamma phase matrix, wherein the plurality of the rafting-resistant gamma prime particles has an average particle perimeter of about 3.0 microns to about 15.0 microns, an average aspect ratio of about 1.2 to about 3.0, and where the microstructure of the nickel-based superalloy is substantially uniform throughout the body dimension of the body.

A second aspect in accordance with the present disclosure provides a nickel-based superalloy including, by weight percent of the nickel-based superalloy, from about 4.0 weight percent to about 7.0 weight percent aluminum (Al), from about 5.0 weight percent to about 10.0 weight percent chromium (Cr), from about 6.0 weight percent to about 10.0 weight percent cobalt (Co), from 0 weight percent to about 1.5 weight percent hafnium (Hf), from 0 weight percent to about 3.0 weight percent molybdenum (Mo), from 0 weight percent to about 2.0 weight percent niobium (Nb), from 0 weight percent to about 6.0 weight percent rhenium (Re), about 4.0 weight percent to about 10.0 weight percent tantalum (Ta), from 0 weight percent to about 4.0 weight percent titanium (Ti), about 4.0 weight percent to about 8.0 weight percent tungsten (W), and the balance Ni and incidental impurities, where the nickel-based superalloy has a microstructure including: a gamma phase matrix, and a gamma prime phase including a plurality of rafting-resistant gamma prime particles dispersed in the gamma phase matrix, wherein the plurality of the rafting-resistant gamma prime particles has an average particle perimeter of about 3.0 microns to about 15.0 microns, an average aspect ratio of about 1.2 to about 3.0, where one or both of the average particle perimeter and the average aspect ratio of the plurality of the rafting-resistant gamma prime particles are substantially uniform throughout the microstructure of the nickel-based superalloy.

A third aspect in accordance with the present disclosure provides a method for preparing an article from a workpiece having a body including a nickel-based superalloy, the method including: heating the workpiece to a sub-solvus temperature at a heat-treating rate, wherein the sub-solvus temperature is a temperature below a $\gamma'$ solvus temperature of the nickel-based superalloy; heat treating the work piece by holding the workpiece at the sub-solvus temperature for a predetermined heat-treatment time; and cooling the workpiece from the sub-solvus temperature at a cooling rate less than 75° F./min for a predetermined cooling time to produce the article, where the method further including: adjusting one or both of the heat-treating rate and the cooling rate to control a formation of a microstructure of the nickel-based superalloy, the microstructure including a gamma phase matrix and a gamma prime phase including a plurality of rafting-resistant gamma prime particles dispersed in the gamma phase matrix, wherein the plurality of the rafting-resistant gamma prime particles has an average particle perimeter of about 3.0 microns to about 15.0 microns and an average aspect ratio of about 1.2 to about 3.0.

BRIEF DESCRIPTION OF THE DRAWINGS

Various objects, features and advantages of the present disclosure will become better understood from following detailed descriptions taken in conjunction with accompanying drawings, in which like reference numerals designate the same or similar parts throughout several views.

FIGS. 3a-3c show respective micrographs of portions of a microstructure of a Ni-based superalloy I (a reference nickel-based superalloy) in an inner section (FIG. 3a), an intermediate section (FIG. 3b), and an outer section (FIG. 3c) of a body of an article prepared therefrom, according to embodiments of the present disclosure;

FIGS. 4a-4c show respective micrographs of portions of a microstructure of a Ni-based superalloy II in an inner section (FIG. 4a), an intermediate section (FIG. 4b), and an outer section (FIG. 4c) of a body of an article prepared therefrom, according to embodiments of the present disclosure;

FIGS. 5a-5c show respective micrographs of portions of a microstructure of a Ni-based superalloy III in an inner section (FIG. 5a), an intermediate section (FIG. 5b), and an outer section (FIG. 5c) of a body of an article prepared therefrom, according to embodiments of the present disclosure;

Figure 1:
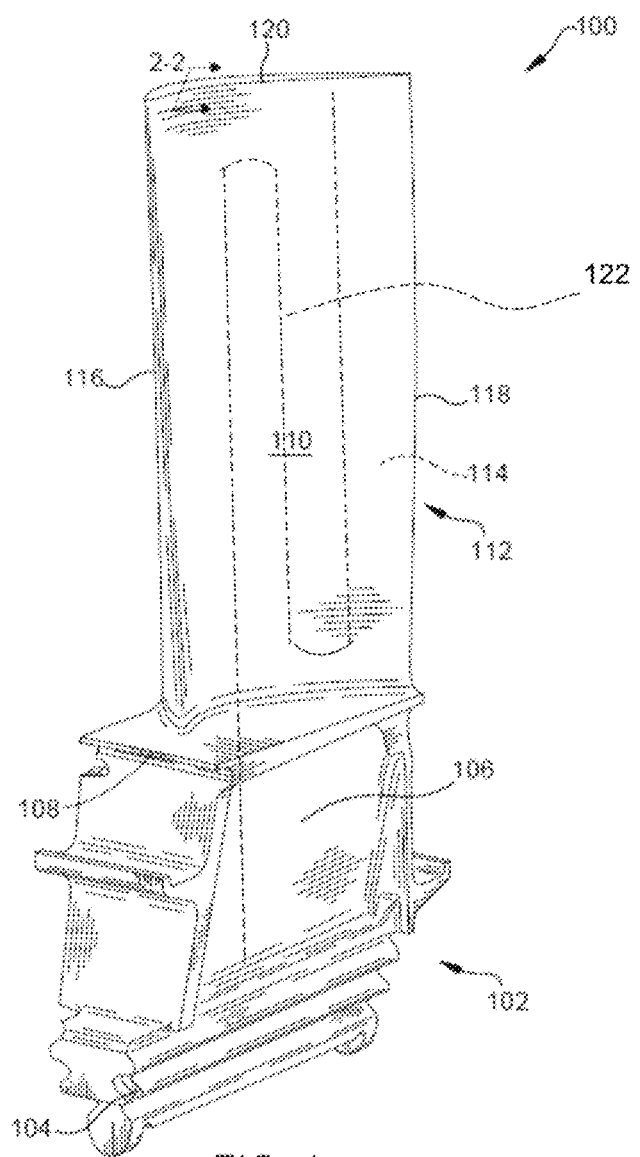
FIG. 1 shows a perspective view of a rotating blade of the type in which embodiments of the present disclosure may be employed.

It is noted that the drawings of the disclosure may not be drawn to scale. The drawings are intended to depict only typical aspects of the disclosure, and therefore should not be considered as limiting the scope of the present disclosure.

DETAILED DESCRIPTION

Certain embodiments will now be described to provide an overall understanding of the principles of the structure, function, manufacture, and use of the methods, systems, and devices disclosed herein. One or more examples of these embodiments are illustrated in accompanying drawings. Those skilled in the art will understand that methods, systems, and devices specifically described herein and illustrated in the accompanying drawings are non-limiting embodiments. Features illustrated or described in connection with one embodiment may be combined with features of other embodiments. Such modifications and variations are intended to be included within the scope of the present disclosure.

In the following specification and the claims, the singular forms "a", "an" and "the" include plural referents unless the context clearly dictates otherwise. As used herein, the term "or" is not meant to be exclusive, refers to at least one of the referenced components being present, and includes instances in which a combination of the referenced components may be present, unless the context clearly dictates otherwise. Where an element or layer is referred to as being "on," "engaged to," "adjacent," "connected to," or "coupled to" another element or layer, it may be directly on, engaged, adjacent, connected or coupled to the other element or layer, or intervening elements or layers may be present. In contrast, when an element is referred to as being "directly on," "directly engaged to," "directly adjacent," "directly connected to" or "directly coupled to" another element or layer, there may be no intervening elements or layers present. Other words used to describe the relationship between elements should be interpreted in a like fashion (e.g., "between" versus "directly between," etc.). As used herein, the term "and/or" includes any and all combinations of one or more of the associated listed items.

The present disclosure offers advantages and alternatives over existing nickel-based superalloys and articles prepared therefrom by providing a nickel-based superalloy configured to have a microstructure that includes a gamma phase matrix and a γ' phase with a plurality of rafting-resistant γ' particles dispersed in the gamma phase matrix. The parameters of the rafting-resistant γ' particles are selected and controlled to provide a substantially uniform microstructure of the nickel-based superalloy throughout the article prepared therefrom, thereby imparting a property of a reduced rate of crack growth in the article compared to the article prepared from a conventional nickel-based superalloy. In addition, in Ni-based superalloys of the current disclosure, it is not necessary to reduce a volume fraction of the γ' phase, thereby allowing the γ' phase to be present in a high volume fraction such that full benefits of the high strengthening effect of the γ' phase may be utilized. The approach of the current disclosure is advantageous compared to the conventional approach of reducing a volume fraction of γ' phase with strengthening effect of the γ' phase sacrificed. Furthermore, the approach of the present disclosure is especially beneficial to applications that involve heavy industrial components, for example, a gas turbine blade with a weight of greater than 15 lbs, and in certain embodiments, up to 55 lbs. The substantially uniform microstructure of the Ni-based superalloy may allow a reduced rate of crack growth in the heavy gas turbine blades, while the ability to maintain a high volume fraction of the γ' phase in the Ni-based superalloy contributes to the high strength of the gas turbine blade under high temperature operating environments.

FIG. 1 shows an illustrative component of a turbomachine, e.g., a rotating blade 100 of the type, in which embodiments of the present disclosure may be employed. Turbine rotating blade 100 includes a root 102 by which rotating blade 100 attaches to rotor (not shown) of the turbomachine. Root 102 may include a dovetail 104 configured for mounting in a corresponding dovetail slot in the rotor. Root 102 may further include a shank 106 that extends between dovetail 104 and a radially inward platform 108, which is disposed at the junction of airfoil body 110 and root 102 and defines a portion of the inboard boundary of the flow path through turbine assembly (not shown) of the turbomachine. Airfoil body 110 is the active component of rotating blade 100 that intercepts the flow of working fluid and induces the rotor disc to rotate. It will be seen that airfoil body 110 of rotating blade 100 includes a concave pressure side (PS) outer side wall 112 and a circumferentially or laterally opposite convex suction side (SS) outer side wall 114 extending axially between opposite leading edge and trailing edge 116, 118 respectively. Side walls 112 and 114 also extend in a radial direction from platform 108 of the turbomachine to an outboard tip 120.

Figure 2:
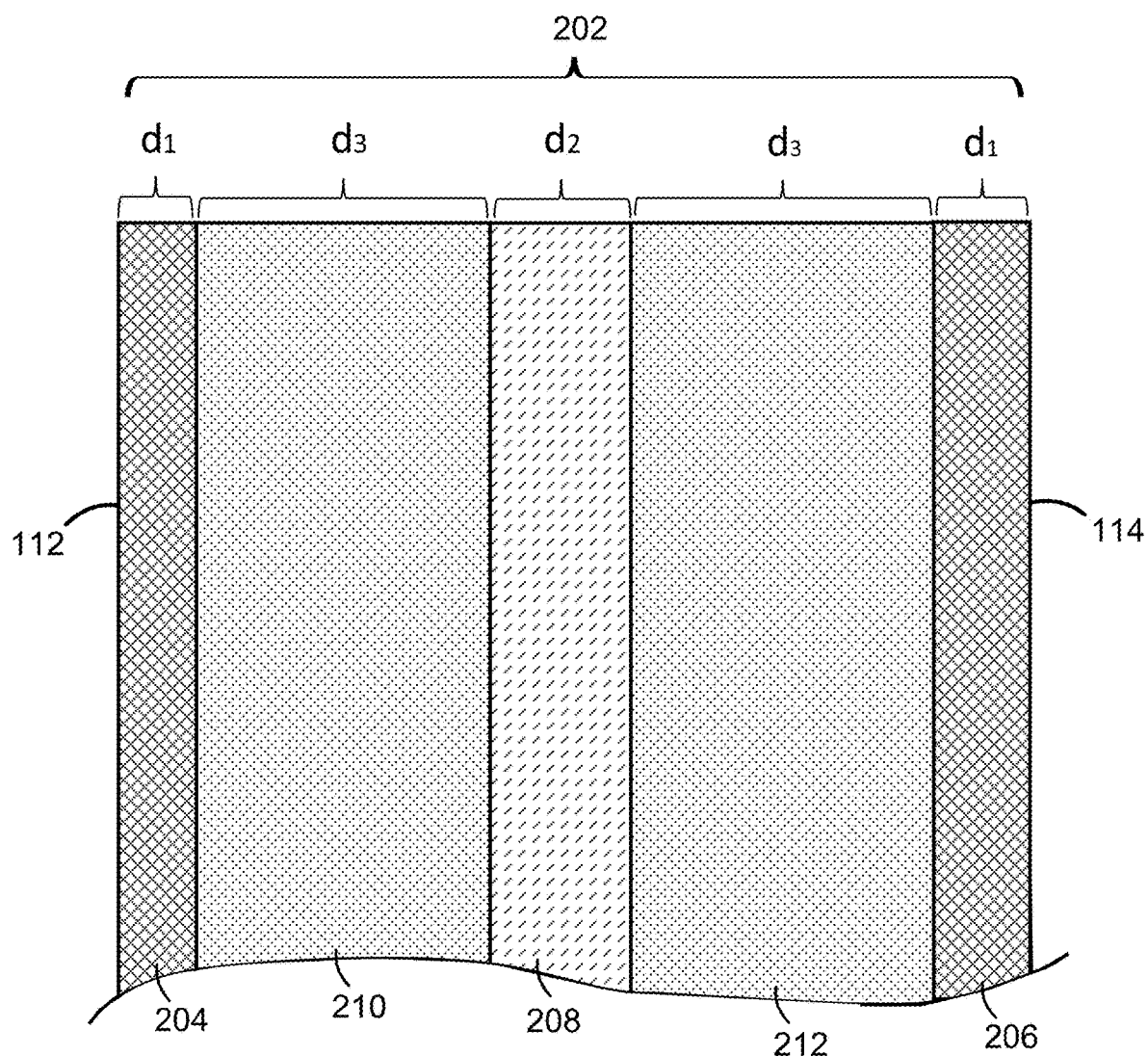
FIG. 2 is a cross-sectional view of a portion of the blade of FIG. 1 taken along line 2-2, according to embodiments of the present disclosure.

FIG. 2 is a partial, magnified cross-sectional view of rotating blade 100 of FIG. 1, taken along line 2-2. As illustrated in FIG. 1, body 110 of blade 100 has concave pressure side (PS) outer wall 112 and convex suction side (SS) outer wall 114. FIG. 2 further illustrates a body dimension 202 (e.g., a thickness) of an article (e.g., blade 100) extending between a first side wall (e.g., concave pressure side (PS) outer side wall 112) and an opposite second side wall (e.g., convex suction side (SS) outer side wall 114). Body dimension 202 includes outer sections 204 and 206 adjacent side walls 112 and 114, respectively, each outer section 204 and 206 having a first dimension $d_1$. Body dimension 202 further includes an inner section 208 having a second dimension $d_2$, and intermediate sections 210 and 212 adjacent respective outer sections 204 and 206, and inner section 208, each intermediate section 210 and 212 having a third dimension $d_3$. In some embodiments, intermediate sections 210, 212 may directly adjacent respective outer sections 204 and 206, and also directly adjacent inner section 208.

It is to be understood that FIG. 2 is used as a non-limiting example to illustrate that body dimension 202 of an article may be comprised of outer, inner, and intermediate sections. The dimensions $d_1$, $d_2$ and $d_3$ are magnified and not drawn to scale with regard to FIG. 1. Furthermore, the dimensions $d_1$, $d_2$ and $d_3$ are not limited as drawn in FIG. 2, and the ratio between dimensions $d_1$, $d_2$ and $d_3$ may also vary. In embodiments, each of outer sections 204 and 206 may have same or different first dimension $d_1$, and each of intermediate sections 210 and 212 may have same or different third dimension $d_3$. The lines and/or boundaries and/or gradient between each section are drawn for illustration purposes only, and may not represent a physical existence of the lines and/or boundaries. In certain embodiments, outer sections 204 and 206, inner section 208, and intermediate section 210 and 212 may form a continuous segment across body dimension 202, substantially free of cavities disposed within one or more of the outer, inner, and intermediate sections. In some embodiments, various forms and shapes one or more hollow cooling passageways now known or later developed may be disposed within one or more of the outer, inner, and intermediate sections. For example, a non-limiting example of a cooling passageway 122 as illustrated in FIG. 1 may be implemented within one or more of the outer, inner, and intermediate sections. The outer, inner, and intermediate sections may be formed from same material(s). In some embodiments, body dimension 202 may be an axial dimension (e.g., a width) extending axially between leading edge 116 and trailing edge 118 of blade 100 of FIG. 1. The axial dimension may be similarly comprised of outer sections, an inner section, and intermediate sections adjacent respective outer section and the inner section. In certain embodiments, the body may be a portion of a turbine component selected from a group consisting of a shank, a bucket, a blade, a nozzle, a vane, a shroud, and any combinations thereof.

It has been discovered in the present disclosure that by developing nickel-based superalloys with specifically controlled parameters of γ' particles, a substantially uniform microstructure of the nickel-based superalloy may be achieved. For example, a body of an article prepared from such nickel-based superalloy may have a substantially uniform microstructure throughout the body dimension of the article, across the outer, inner, and intermediate sections (as illustrated in FIG. 2), as will be discussed in more detail later. This is especially advantageous for articles with thick sections, e.g., a shank section of a turbine blade, where a uniform heating and cooling in the superalloy processing may not be practical, leading to a non-uniform superalloy microstructure with γ' particles more susceptible to rafting, when a conventional nickel-based superalloy is used.

FIGS. 3a-3c show micrographs of a portion of a microstructure of a nickel-based superalloy I (a reference superalloy) in an article. In the micrographs, the light gray areas represent the γ matrix and the dark black areas represent the γ' phase (more clearly indicated by arrows in FIG. 4b) in the Ni-based superalloy I. A non-uniform microstructure of the reference nickel-based superalloy I is observed, with more rafting occurring in both the inner section (FIG. 3a) and the outer section (FIG. 3c) than in the intermediate section (FIG. 3b). Under the combined influence of stress and temperature, initial γ'-cuboidal particles may transform into plates, which are usually called rafting. It can also be seen that in this embodiment, the γ' phase in the inner section (FIG. 3a) and the outer section (FIG. 3c) has different rafting profile and/or orientation where the rafting in the inner section and the outer section occurs in different directions. Without being bound by the theory, the non-uniform rafting of the γ' phase of the nickel-based superalloy is believed to be a major contributing factor to a high crack growth or rafting of the article prepared therefrom.

FIGS. 4a-4c show micrographs of a portion of a microstructure of a Ni-based superalloy II in an article, according to embodiments of the present disclosure. FIG. 5a-5c show micrographs of a portion of a microstructure of a Ni-based superalloy III in an article, according to embodiments of the present disclosure. The nickel-based superalloys have a microstructure that includes: a γ phase matrix (as represented as the light gray areas indicated by arrow), and a γ' phase including a plurality of γ' particles dispersed in the gamma phase matrix (as represented as the dark black areas indicated by arrow). For superalloys II and III, substantially uniform microstructures are observed throughout the body dimension of the article body, e.g., across the inner section (FIGS. 4a and 5a), the intermediate section (FIGS. 4b and 5b), and the outer section (FIGS. 4c and 5c) of the body of the article. In some embodiments, the γ' phase has a morphology profile that is substantially uniform between the intermediate section and at least one of the inner section and the outer section. That is, unlike conventional nickel-based superalloys, the superalloys according to embodiments of the present disclosure do not show significant γ' phase morphology changes by location in the body of the article. An article prepared from superalloy II or superalloy III has a reduced rate of crack growth compared to the article prepared from reference superalloy I, for example, in certain embodiments, the rate of crack growth length over time may be at least 1000 times lower.

As used herein, the term "superalloy" refers to a material strengthened by a precipitate dispersed in a matrix phase.

Commonly known examples of superalloys include nickel-based superalloys strengthened by γ' precipitates dispersed in a gamma phase matrix (e.g., γ' precipitation-strengthened nickel-based superalloys). The term "nickel-based" generally means that the composition has a greater amount of nickel present than any other constituent element. The terms "alloy(s)," "superalloy(s)", "nickel-based superalloy(s)", and "γ' precipitation-strengthened nickel-based superalloy(s)" may be used interchangeably in the disclosure. In some embodiments, the nickel-based superalloy has a single crystal grain microstructure.

Typically, in γ' precipitation-strengthened nickel-based superalloys, one or more of chromium, tungsten, molybdenum, iron and cobalt are principal alloying elements that combine with nickel to form the γ phase matrix. One or more of aluminum, titanium, tantalum, niobium, and vanadium are principal alloying elements that combine with nickel to form a desirable strengthening precipitate of γ' phase, that is $Ni_3$ (Al, X), where X may be one or more of titanium, tantalum, niobium and vanadium.

In certain embodiments of the present disclosure, the nickel-based superalloy includes, by weight percent of the superalloy, at least 30 weight percent nickel. In embodiments, the Ni-based superalloy includes from about 4.0 weight percent to about 7.0 weight percent aluminum. For example, the weight percent of aluminum in the Ni-based superalloy may be about 4.0, 4.5, 5.0, 5.5, 6.0, 6.5, 7.0, including ranges between any two numerical values in the list. The Ni-based superalloy may include from 0 weight percent to about 2.0 weight percent niobium (Nb). For example, the weight percent of niobium in the Ni-based superalloy may be about 0.1, 0.2, 0.5, 1.0, 1.5, 2.0, including ranges between any two numerical values in the list. In embodiments, the nickel-based superalloy may be substantially free of niobium. The Ni-based superalloy may include from about 4.0 weight percent to about 10.0 weight percent tantalum (Ta). For example, the weight percent of tantalum in the Ni-based superalloy may be about 4.0, 5.0, 5.5, 6.0, 7.0, 7.5, 8.0, 9.0, 10.0, including ranges between any two numerical values in the list. The Ni-based superalloy may include from 0 weight percent to about 4.0 weight percent titanium (Ti). For example, the weight percent of titanium in the Ni-based superalloy may be about 0, 0.1, 0.2, 0.5, 1.0, 1.5, 2.0, 2.5, 3.0, 3.5, 4.0, including ranges between any two numerical values in the list. In embodiments, the nickel-based superalloy may be substantially free of titanium. In embodiments, the Ni-based superalloy may be substantially free of vanadium.

The Ni-based superalloy may further include additional elements. The Ni-based superalloy may include from about 5.0 weight percent to about 25.0 weight percent chromium (Cr). For example, the weight percent of chromium in the Ni-based superalloy may be about 5.0, 6.0, 7.0, 8.0, 9.0, 10.0, 15.0, 20.0, 25.0, including ranges between any two numerical values in the list. The nickel-based superalloy may include from 0 weight percent to about 20.0 weight percent cobalt (Co). For example, the weight percent of cobalt in the Ni-based superalloy may be about 6.0, 6.5, 7.0, 7.5, 8.0, 8.5, 9, 9.5, 10.0, 15.0, 20.0, including ranges between any two numerical values in the list. The Ni-based superalloy may include from 0 weight percent to about 3.0 weight percent of hafnium (Hf). For example, the weight percent of hafnium in the Ni-based superalloy may be about 0, 0.1, 0.2, 0.5, 1.0, 1.5, 2.0, 2.5, 3.0, including ranges between any two numerical values in the list. The Ni-based superalloy may include from 0 weight percent to about 4.0 weight percent molybdenum (Mo). For example, the weight percent of molybdenum in the Ni-based superalloy may be about 0, 1.0, 1.5, 2.0, 2.5, 3.0, 3.5, 4.0, including ranges between any two numerical values in the list. The Ni-based superalloy may include from 0 weight percent to about 6.0 weight percent rhenium (Re). For example, the weight percent of rhenium in the Ni-based superalloy may be about 0, 0.5, 1.0, 1.5, 2.0, 2.5, 3.0, 3.5, 4.0, 4.5, 5.0, 5.5, 6.0, including ranges between any two numerical values in the list. The Ni-based superalloy may include from 4.0 weight percent to about 8.0 weight percent tungsten (W). For example, the weight percent of tungsten in the Ni-based superalloy may be about 4.0, 5.0, 6.0, 7.0, 8.0, including ranges between any two numerical values in the list. The Ni-based superalloy may further optionally include from 0 weight percent to about 0.1 weight percent zirconium (Zr), from 0 weight percent to about 0.2 weight percent carbon (C), from 0 weight percent to about 0.1 weight percent boron (B). The balance of Ni-based superalloy is essentially nickel and incidental impurities.

In particular embodiments, the nickel-based superalloy includes from about 4.0 weight percent to about 7.0 weight percent aluminum, from about 5.0 weight percent to about 10.0 weight percent chromium, from about 6.0 weight percent to about 10.0 weight percent cobalt, from 0 weight percent to about 1.5 weight percent of hafnium, from 0 weight percent to about 3.0 weight percent molybdenum, from 0 weight percent to about 2.0 weight percent niobium, from 0 weight percent to about 6.0 weight percent rhenium, from about 4.0 weight percent to about 10.0 weight percent tantalum, from 0 weight percent to about 4.0 weight percent titanium, from about 4.0 weight percent to about 8.0 weight percent tungsten, and balance essentially nickel and incidental impurities.

In preferred embodiments, the nickel-based superalloy includes from about 6.0 weight percent to about 7.0 weight percent aluminum, from about 5.0 weight percent to about 7.0 weight percent chromium, from about 6.5 weight percent to about 8.5 weight percent cobalt, from about 0.1 weight percent to about 0.2 weight percent of hafnium, from about 1.0 weight percent to about 2.0 weight percent molybdenum, from 0 weight percent to about 3.5 weight percent rhenium, from about 5.5 weight percent to about 7.5 weight percent tantalum, from about 5.0 weight percent to about 7.0 weight percent tungsten, and balance essentially nickel and incidental impurities.

In certain embodiments, the Ni-based superalloy may include a base alloy. The base alloy may be one or more of CMSX 4, TMS 75, TMS 82, Rene N2, Rene N5, Rene N6, Rene N500, Rene N515, or PWA 1484. These base alloys are well known to a skilled person in the art.

As used herein and throughout the present disclosure, the term "substantially free" when used with a specified element means that the Ni-based superalloy includes from 0 weight percent to about 0.1 weight percent of such specified element. For example, "substantially free of niobium" may include embodiments where the Ni-based superalloy includes no niobium, or less than about 0.1 weight percent of niobium, or from 0 weight percent to about 0.1 weight percent of niobium.

The term, "weight percent" of a specified element in a Ni-based superalloy, as used herein and throughout the present disclosure, refers to a weight percent of such specified element in the Ni-based superalloy based on a total weight of the Ni-based superalloy.

As described in earlier sections, the nickel-based superalloy has a microstructure that may include a γ phase matrix and a γ' phase having a plurality of rafting-resistant γ' particles that precipitate in the γ phase matrix.

Figure 6:
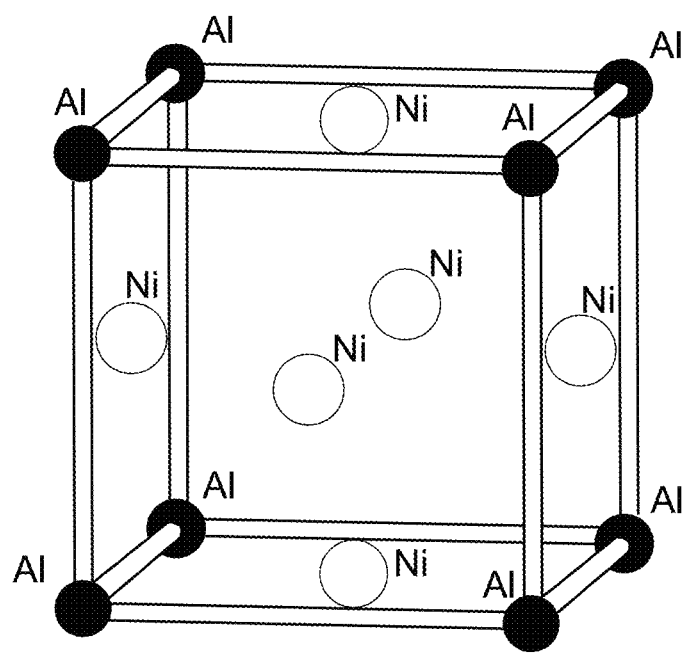
FIG. 6 illustrates a crystal structure of a γ' phase of a Ni-based superalloy $Ni_3Al$, according to embodiments of the present disclosure.

The γ' particles typically have an ordered face-centered cubic L1$_2$ structure. For example, FIG. 6 shows a representative crystal structure of the γ' particles of a Ni$_3$Al alloy, in which the γ' particles has a cubic-P (primitive cubic) lattice with the nickel atoms at the face-centers and the aluminum (Al) atoms at the cube corners. Other alloys such as Ni$_3$Ti or Ni$_3$(Al, Ti) may have similar structures where aluminum atoms may be partly or totally replaced by titanium atoms. In addition to aluminum and titanium, niobium, hafnium and tantalum may also partition preferentially into the γ' phase. As described above, γ' particles may act as a strengthening agent and provide Ni-based superalloys with their desirable high-temperature characteristics such as high strength under high temperature operating environments. As used herein, the term "high temperature" refers to a temperature higher than 1000 degrees Fahrenheit. In some embodiments, the high temperature refers to an operating temperature of an article, for example, a turbine engine.

Without being bound to the theory, it is hypothesized that under certain conditions, atomic rearrangement within the face-centered cubic L1$_2$ structure of γ' particles may occur, causing rafting of the γ' phase or γ' particles and crack growth of the nickel-based superalloy having such γ' phase.

It has been discovered that a Ni-based superalloy can be developed with controlled parameters of γ' particles in a microstructure thereof, leading to a significantly improved Ni-based superalloy with rafting-resistant γ' particles and a reduced crack growth. As mentioned earlier, in the conventional approach, the volume fraction of the γ' phase of Ni-based superalloy is reduced to reduce rafting, for example, by reducing a weight percentage of aluminum in the Ni-based superalloy. In contrast, in the current disclosure, the desirable high volume fraction of the strengthening γ' phase in the nickel-based superalloy does not need to be reduced, thus achieving the goal of maintaining the high strength of the nickel-based superalloy while reducing detrimental crack growth at the same time. The γ' particles and the γ' phase of the present disclosure may, therefore, also be referred to as "rafting-resistant γ' particles," and/or "rafting-resistant γ' phase," which are used interchangeably throughout the present disclosure. The microstructure of the nickel-based superalloy including rafting-resistant γ' particles may be referred to as "rafting-resistant microstructure."

In certain embodiments, an article having a body including a nickel-based superalloy is provided. The body has a first side wall, a second side wall opposite to the first side wall, and a body dimension extending between the first side wall and the second side wall. The body further includes a nickel-based superalloy having a microstructure that includes a γ matrix, and a γ' phase including a plurality of rafting-resistant γ' particles dispersed in the γ matrix. The plurality of the γ' particles has an average perimeter of about 3 microns to about 15 microns and an average aspect ratio of about 1.2 to about 3, and the microstructure of the nickel-based superalloy is substantially uniform throughout the body dimension of the body. In embodiments, average perimeter of the plurality of the γ' particles for a certain portion or a region of interest (ROI) in the microstructure of a nickel-based superalloy may be measured by first taking a plurality of images in the selected ROI of the microstructure. Then an analytical instrument, such as scanning electron microscope (SEM), may be used to convert each of the plurality of images into a two-tone image (e.g., black and white) highlighting only γ phase matrix and γ' phase (e.g., as illustrated in FIG. 4b with a portion of a representative image of the γ phase matrix and γ' phase indicated by arrows). A computer image analysis software now known or later developed may be used to average the width and height of the plurality of γ' phase particles, and further to provide an average perimeter for the plurality of γ' phase particles. For example, in some embodiments, Image J, an open source image processing program developed by the National Institutes of Health, may be used as the computer image analysis software.

It is to be understood that SEM is described here as a non-limiting example. The microstructure of the superalloy may be analyzed and/or characterized in micrographs obtained by currently known or future developed techniques including, but not limited to, optical microscopy (OM). The sample imaged in the SEM may be polished and etched using standard metallurgical laboratory techniques. Image analysis may be carried out on the micrographs using any now known or future developed imaging software to quantitatively characterize the parameters of plurality of the rafting-resistant gamma prime particles in the microstructure including, but not limited to, particle size, particle perimeter, aspect ratio, spacing between neighboring gamma prime particles, volume fraction, and corresponding average value of any of these parameters. The volume fraction of the γ' phase in the Ni-based superalloy may be characterized by measuring an area fraction of the γ' phase using the image analysis method described herein. As used herein and throughout the specification, the term "volume fraction" of the γ' phase in the Ni-based superalloy refers to a volume percent (% v/v) of the γ' particles in a total volume of the Ni-based superalloy. Methods to characterize the volume fraction and/or the area fraction of the γ' phase are known to one skilled in the art. For example, the area fraction of the γ' phase may be characterized by taking a sum of measured areas of the plurality of images of the γ' particles in a ROI, divided by the total areas of the ROI in the microstructure of the Ni-based superalloy. In some embodiments, the value of the area fraction of the γ' phase may be used as a substitute for the value of the volume fraction of the γ' phase. In embodiments, the value of the area fraction of the γ' phase may be the same as the value of the volume fraction of the γ' phase. As used herein and throughout the description, the aspect ratio of a γ' particle may refer generally to a ratio of a major axis dimension to that of a minor dimension of the γ' particle. An average aspect ratio of a plurality of the γ' particles may be obtained by measuring respective aspect ratio of individual γ' particles of the plurality of the γ' particles and averaging the measured value of aspect ratio of individual γ' particles.

In certain embodiments, the plurality of the rafting-resistant γ' particles may have controlled parameters that include, but not limited to, an average particle perimeter in a range of about 2.0 microns to about 25.0 microns. For example, average particle perimeter may be about 2.0 microns, about 3.0 microns, about 4.0 microns, about 5.0 microns, about 6.0 microns, about 7.0 microns, about 8.0 microns, about 9.0 microns, about 10.0 microns, about 15.0 microns, about 20.0 microns, about 25.0 microns, including ranges between any two numerical values in the list. In some embodiments, the average particle perimeter may be in a range of about 3.0 to about 20.0 microns, in a range of about 3.0 to about 15.0 microns, in a range of about 3.0 to about 10.0 microns, in a range of about 3.0 to about 7.0 microns, in a range of about 4.0 to about 15.0 microns, in a range of about 4.0 to about 10.0 microns, or in a range of about 7.0 to about 12.0 microns.

In some embodiments, the plurality of the rafting-resistant γ' particles may have an average aspect ratio (AR) in a range of about 0.5 to about 3.0. For example, average aspect ratio (AR) may be 0.5, 0.8, 1.0, 1.2, 1.4, 1.6, 1.8, 2.0, 2.2, 2.4, 2.6, 2.8, and 3.0, including ranges between any two numerical values in the list. In embodiments, the average aspect ratio (AR) may be in a range of about 1.5 to about 3.0, in a range of about 1.5 to about 2.5, in a range of about 1.5 to about 2.2, or in a range of about 1.2 to about 3.0.

In embodiments, the rafting-resistant γ' particles of the present disclosure may have an average particle size of about 1.0 micron to about 6.0 microns. For example, the average particle size may be about 1.0 micron, about 1.5 microns, about 2.0 microns, about 2.5 microns, about 3.0 microns, about 3.5 microns, about 4.0 microns, about 4.5 microns, about 5.0 microns, about 5.5 microns, about 6.0 microns, including ranges between any two numerical values in the list. In embodiments, the average particle size may be in a range of about 1.0 micron to about 5.0 microns, in a range of about 1.0 micron to about 4.0 microns, or in a range of about 1.5 microns to about 5.0 microns.

In certain embodiments, the rafting-resistant γ' phase may be present in at least 40 volume percent of the Ni-based superalloy. For example, the rafting-resistant γ' phase may be present in about 50 volume percent, about 55 volume percent, about 60 volume percent, about 65 volume percent, about 70 volume percent, about 75 volume percent, including ranges between any two numerical values in the list. In embodiments, the γ' phase may be present in about 55 volume percent to about 75 volume percent of the superalloy. It is further to be understood that the terms "gamma prime phase," "γ' phase," "gamma prime particles," "γ' particles," "rafting-resistant γ' phase," and "rafting-resistant γ' particles," may be used interchangeably throughout the present disclosure.

Figure 7:
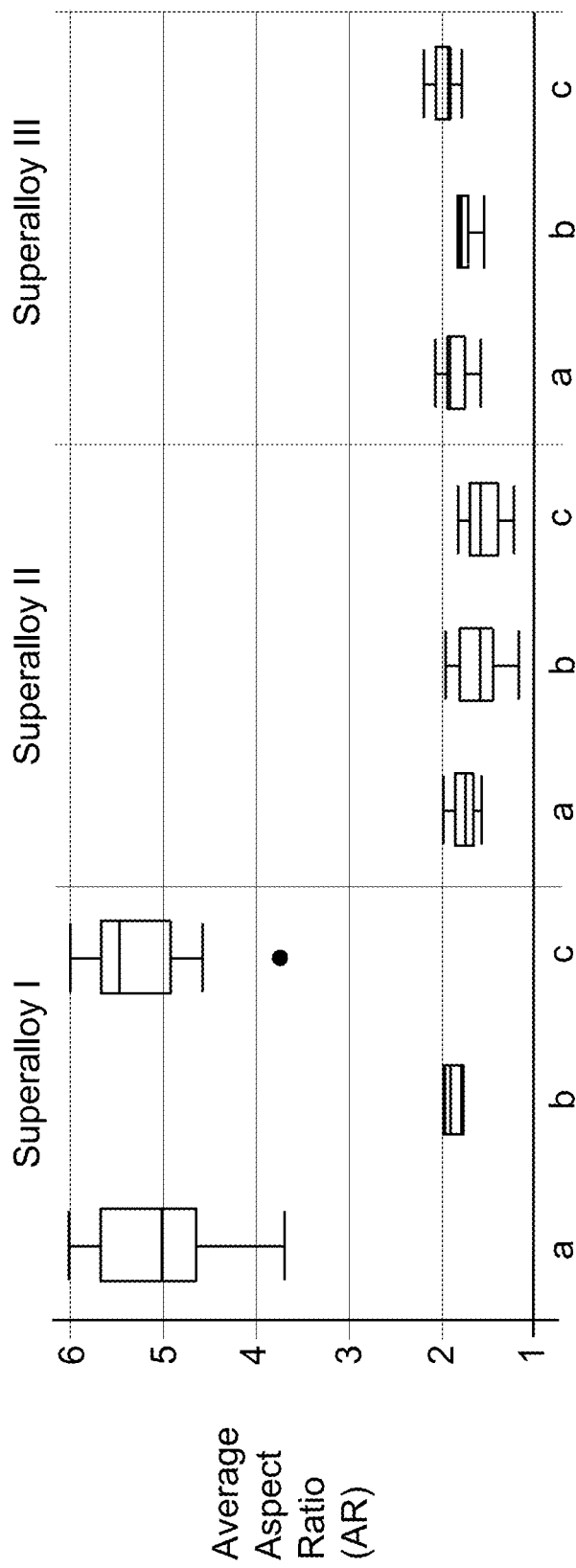
FIG. 7 shows box plots of measured average aspect ratio (AR) of γ' particles of Ni-based superalloys I, II and III for respective inner section (a), intermediate section (b), and outer section (c) of bodies of articles having corresponding Ni-based superalloys, according to embodiments of the present disclosure.

FIG. 7 shows comparison of average aspect ratio (AR) of γ' particles of Ni-based superalloy I, II and III for respective inner section (a), intermediate section (b), and outer section (c) of the body of articles having corresponding superalloys, according to embodiments of the present disclosure. It can be seen that the average of AR of the γ' particles is substantially uniform throughout the body dimension across various sections in the article prepared from the superalloys II and III. In contrast, in the article prepared from reference superalloy I, significant non-uniformity is observed, for example, average aspect ratio is significant different between the intermediate section and at least one of the inner section and the outer section of the article. It is to be noted that the superalloys I, II and III in FIG. 7 are the same as superalloys I, II and III used in FIGS. 3a-3c, respectively, and throughout the rest of the present disclosure.

Figure 8:
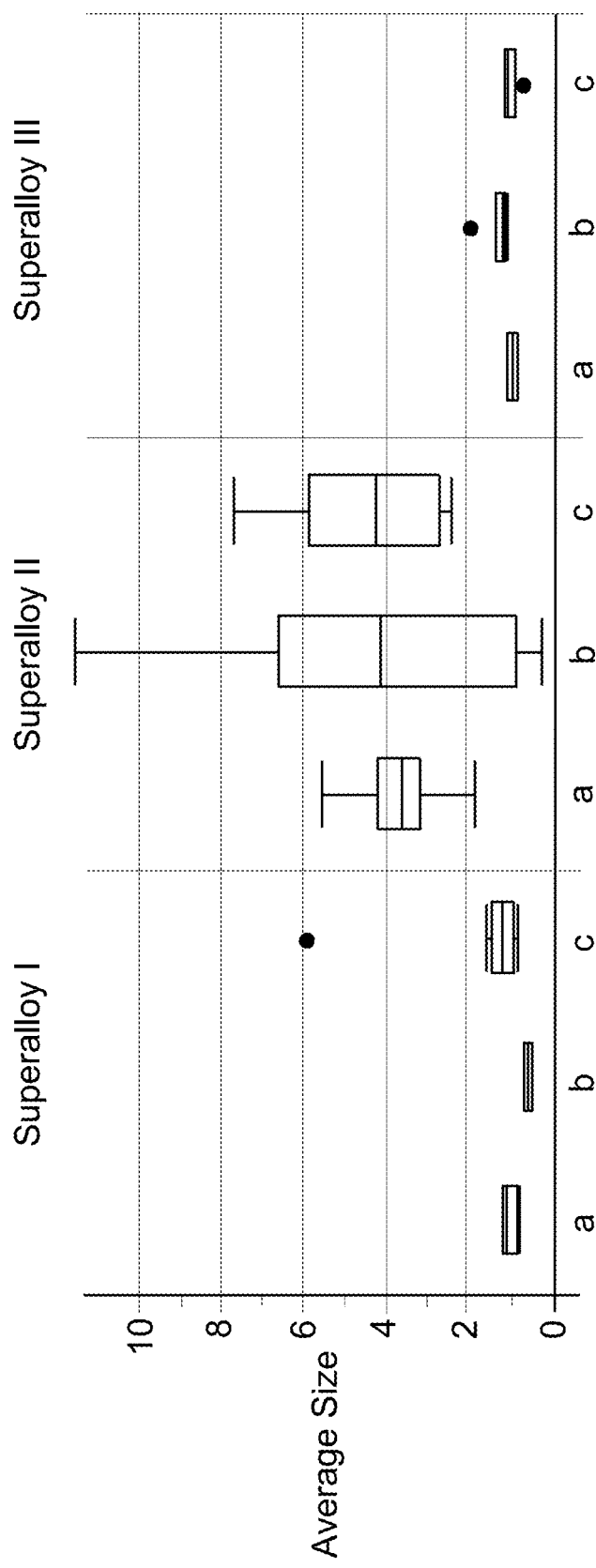
FIG. 8 shows box plots of measured average particle size of γ' particles of Ni-based superalloys I, II and III for respective inner section (a), intermediate section (b), and outer section (c) of the body of articles having corresponding superalloys, according to embodiments of the present disclosure.

FIG. 8 shows comparison of average particle size of γ' particles of Ni-based superalloy I, II, and III for respective inner section (a), intermediate section (b), and outer section (c) of the body of articles having corresponding superalloys, according to embodiments of the present disclosure. It can be seen that the average particle size of γ' phase is substantially uniform throughout the body dimension across various sections of the article prepared from superalloys II and III. In contrast, in the article prepared from the reference superalloy I, significant non-uniformity is observed, for example, average particle size is significant different between the intermediate section and at least one of the inner section and the outer section of the article.

As used herein and throughout the specification, the term "substantially uniform" means not to deviate more than +/−10% from a measured value. For example, measured average aspect ratio (AR) of γ' particles is substantially uniform between the intermediate section and at least one of the inner section and the outer section means that the measured average aspect ratio (AR) for the intermediate section does not deviate more than +/−10% from the measured aspect ratio for the inner section or the outer section. In some embodiments, the microstructure of the nickel-based superalloy is substantially uniform throughout the body dimension of the body means that the microstructure includes a plurality of the rafting-resistant gamma prime particles which one or more parameters in which the measured value of the one or more parameters in a location of the body does not deviate more than +/−10% from measured values taken from the rest of the locations throughout the body dimension of the body. In other words, the microstructure includes at least one parameter with measured value that is substantially location-independent. For example, one or both of the average particle perimeter and the average aspect ratio of the plurality of the gamma prime particles have measured values that is substantially uniform throughout the microstructure of the nickel-based superalloy.

Figure 9:
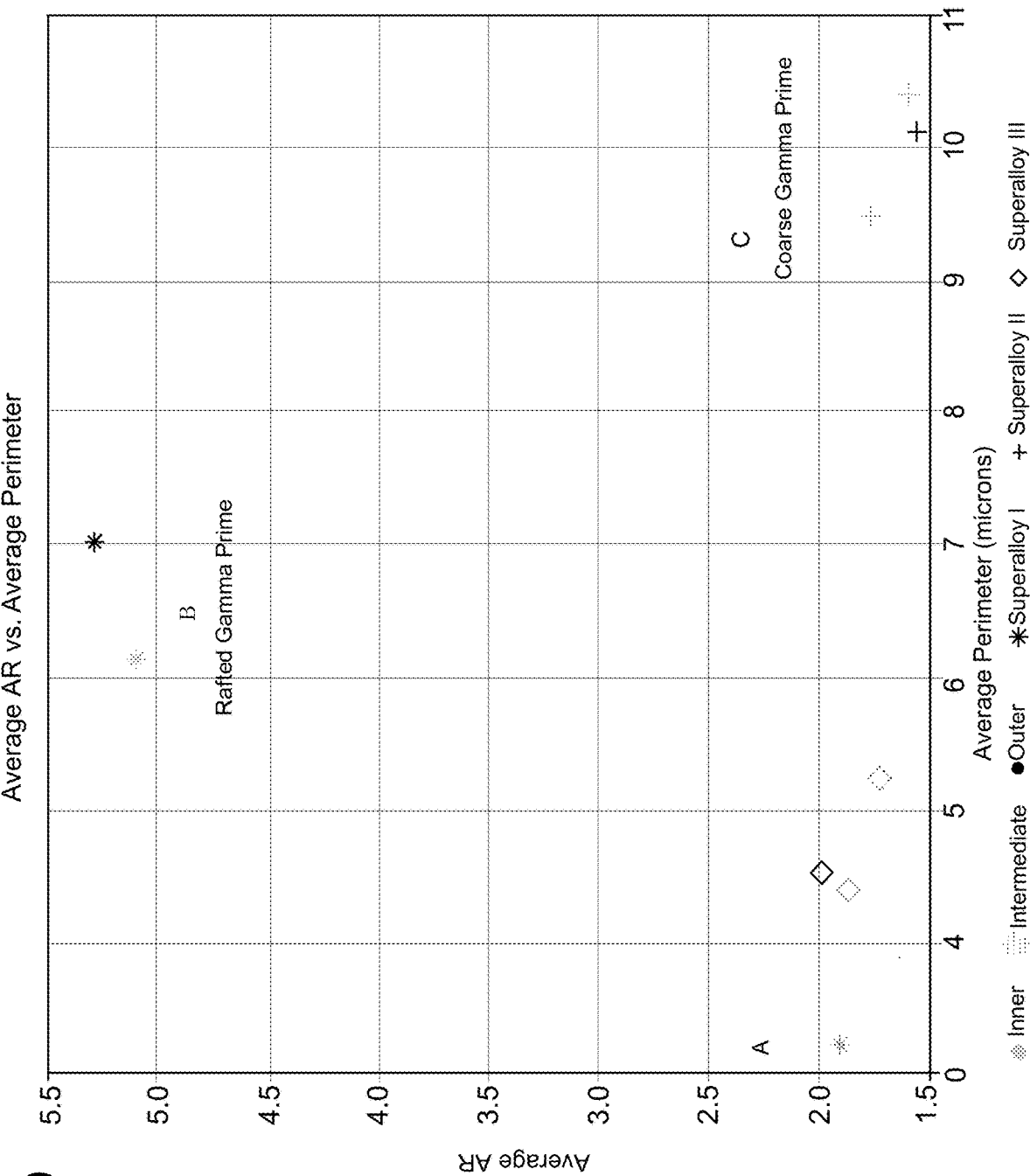
FIG. 9 is a scatter plot of measured average aspect ratio (AR) vs. measured average perimeter (microns) of γ' particles of Ni-based superalloy I, II and III for respective inner section (a), intermediate section (b), and outer section (c) of the body of articles having corresponding superalloys, according to embodiments of the present disclosure.
Figure 10A:
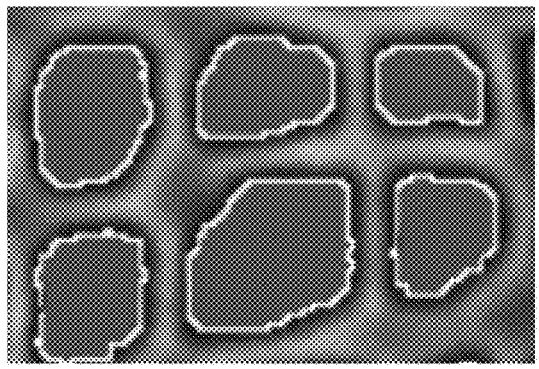
FIGS. 10a-d show representative examples of micrographs with average particle parameters of γ' phase including an average perimeter of about 2.1 microns (FIG. 10 a), aspect ratio AR of about 7.0 (FIG. 10 b), perimeter of about 11.5 microns and aspect ratio AR of about 1.2 (FIG. 10c), and perimeter of about 25.0 microns (FIG. 10 d), for corresponding Ni-based superalloys, according to embodiments of the present disclosure.
Figure 10B:
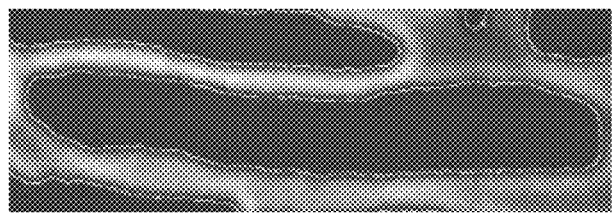
Figure 10C:
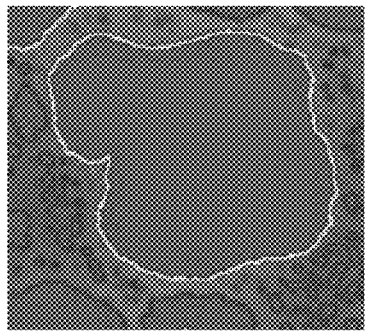
Figure 10D:
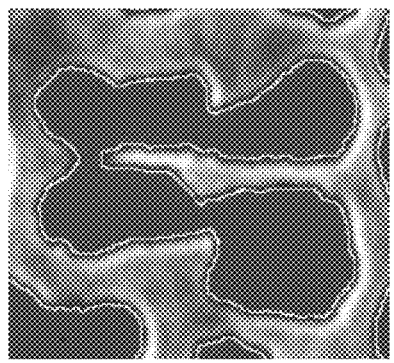

Turning now to FIG. 9, where a scatter plot of measured average aspect ratio (AR) vs. measured average particle perimeter of superalloy I, II and III for respective inner section (a), intermediate section (b), and outer section (c) of the body of articles having corresponding superalloys is presented. For the article prepared from reference superalloy I, a non-uniform microstructure of the superalloy is again observed, where γ' particles of the intermediate section are in region A and substantially free of rafted γ' particles but γ' particles of the inner and outer sections mainly fall under region B, a rafted γ' phase region. In contrast, the articles including superalloys II and III are substantially free of rafted γ' particles throughout the body dimension of the body of the article, including the inner section, the outer section, and the intermediate section (see regions A and C). In accordance with the present disclosure, rafting of the γ' phase may be characterized by certain parameters of the γ' articles, for example, average aspect ratio and/or average particle perimeter. In some embodiments, the plurality of the rafting-resistant gamma prime particles may have an average particle perimeter of about 3.0 microns to about 15.0 microns, and an average aspect ratio of about 1.2 to about 3.0.

In conventional approaches, efforts have been put into producing γ' particles with fine average size (typically less than 0.7 micron) or average particle perimeters, as such γ' particles are believed to provide desirable strengthening effects for the superalloy. Without being bound by the theory, in the present disclosure, it is hypothesized that γ' particles having a fine average size tend to adopt a cuboidal configuration, which may present a lower energy barrier for atom dislocation/movement/displacement, promoting a more rapid rafting formation. Rafting posts significant challenges, for example, in applications involving gas turbine components or articles having a large mass (e.g., greater than about 15 lb.), and/or articles with large internal cooling passages (e.g., a serpentine cooled investment casting). Similar challenges may exist in other applications that involve heavy components with complex shapes and/or segments exposed to uneven heat/cooling. In the present disclosure, it is further hypothesized that a Ni-based superalloy with rafting-resistant γ' phase and a reduced crack growth may be developed by controlling parameters of γ' particles in a microstructure to be in certain configurations. For example, by controlling the parameters of γ' particles including, but not limited to, average aspect ratio and average particle perimeter, the γ' particles of the current disclosure may be configured to adopt a more irregular, more coarse γ' configuration, which deviates from a more regular, cuboidal configuration with very small average particle size and/or perimeter (e.g., typically less than 1.0 micron). The approach of the current disclosure significantly prevents rafting in the article, including the articles that are exposed to uneven heat/cooling.

FIG. 10a-d shows representative non-limiting examples of micrographs with measured parameters of γ' particles including particle perimeter of about 2.1 microns (FIG. 10 a), aspect ratio AR of about 7.0 (FIG. 10 b), perimeter of about 11.5 microns and aspect ratio AR of about 1.2 (FIG. 10c), and perimeter of about 25.0 microns (FIG. 10 d), for corresponding Ni-based superalloys.

Figure 11:
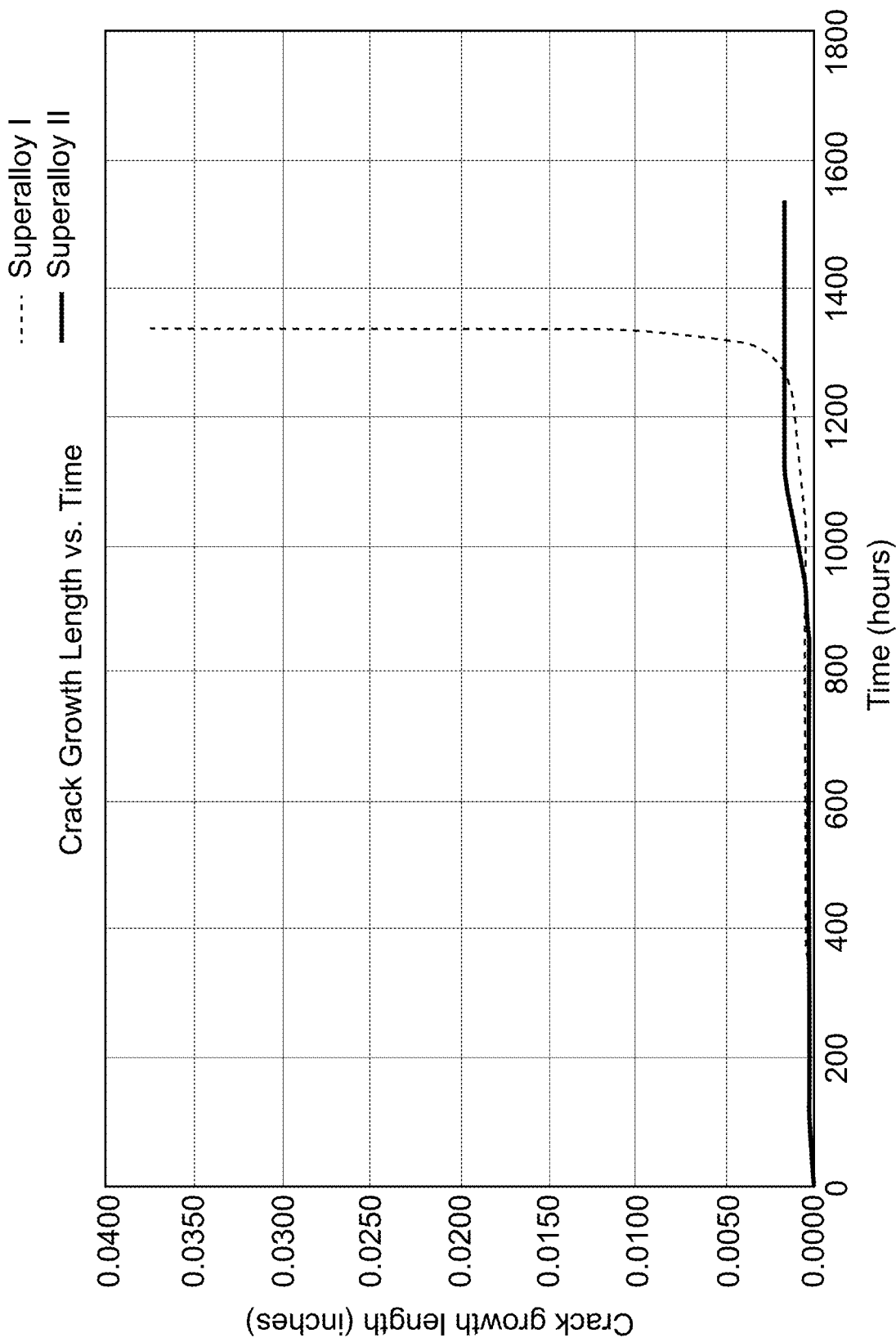
FIG. 11 shows a comparison of crack growth length over time between an article prepared using a conventional Ni-based superalloy (reference superalloy I), and an article prepared using the Ni-based superalloy II, respectively, according to embodiments of the present disclosure.

FIG. 11 shows a comparisons of crack growth length over time between an article prepared using a conventional nickel-based superalloy (reference superalloy I), and an article prepared using nickel-based superalloy II of the present disclosure. Significantly reduced rate of crack growth for the article prepared using nickel-based superalloy II of the present disclosure is observed, for example, when an operation hour of the article exceeds certain operating period, e.g., 1000 hours. It is to be noted that FIG. 11 illustrates a non-limiting example, in which operating hour shown here is representative of the article under specific testing conditions and is not considered to be limiting. The number or duration of operating hours of the articles may be controlled by adjusting chemical compositions, parameters of the γ' particles of the superalloys, and/or testing conditions.

As discussed in earlier sections, the conventional approaches to reduce the crack growth in an article prepared from a nickel-based superalloy have been to produce fine γ' particles and a reduced volume percent of γ' phase in the nickel-based superalloy. To achieve that, the conventional processes focus on developing a cooling rate after heating a workpiece having the nickel-based superalloy to a peak temperature above a solvus temperature of γ' phase. For example, in a conventional process for forming γ' phase in the workpiece having the nickel-based superalloy, the workpiece is heated at a temperature above a γ' solvus temperature of the nickel-based superalloy, and the heat-treated workpiece is cooled with a fast cooling rate, to obtain γ' particles with fine perimeters (typically less than 1 micron). It is hypothesized that combination of heating above γ' solvus temperature and fast cooling rate leads to γ' particles with fine perimeters, which may adopt the ordered face-centered cubical microstructure and contribute to high strengths for an article including the workpiece. For example, the process may involve providing a workpiece having a nickel-based superalloy with a γ' solvus temperature of about 2320 degrees Fahrenheit (° F.); heating the workpiece to above the γ' solvus temperature of about 2320 degrees Fahrenheit (° F.) at a heating rate of 25 degrees Fahrenheit/minute (° F./min) or higher, and after holding the workpiece at 2320° F. for about 2 hours, cooling the workpiece to below 1200° F. with a cooling rate of 75 degrees Fahrenheit/minute (° F./min) or higher. However, as discussed above, while the γ' phase prepared by the conventional process may have γ' particles with fine perimeters which may provide strengthening effect to the Ni-based superalloy, the conventional γ' particles are prone to form rafted γ' phase, which may lead to more crack growth over time in the article. The conventional approaches may result in detrimental microstructures when the article is fully processed and lead to reduction of key mechanical properties such as fatigue capability and resistance to static crack growth.

In contrast, in a process in accordance with embodiments of the present disclosure, the solution heat treatment is modified, for example, by modifying the peak temperature, a heat-treating rate, and/or a cooling rate. For example, the peak temperature for the solution heat treatment is considerably lower than the γ' solvus temperature, and the cooling rate is significantly lower compared to the conventional fast cooling rate. In some embodiments, instead of heating the workpiece at a temperature above the γ' solvus temperature of the nickel-based superalloy, the workpiece may be heat treated at a temperature below the γ' solvus temperature.

Figure 12:
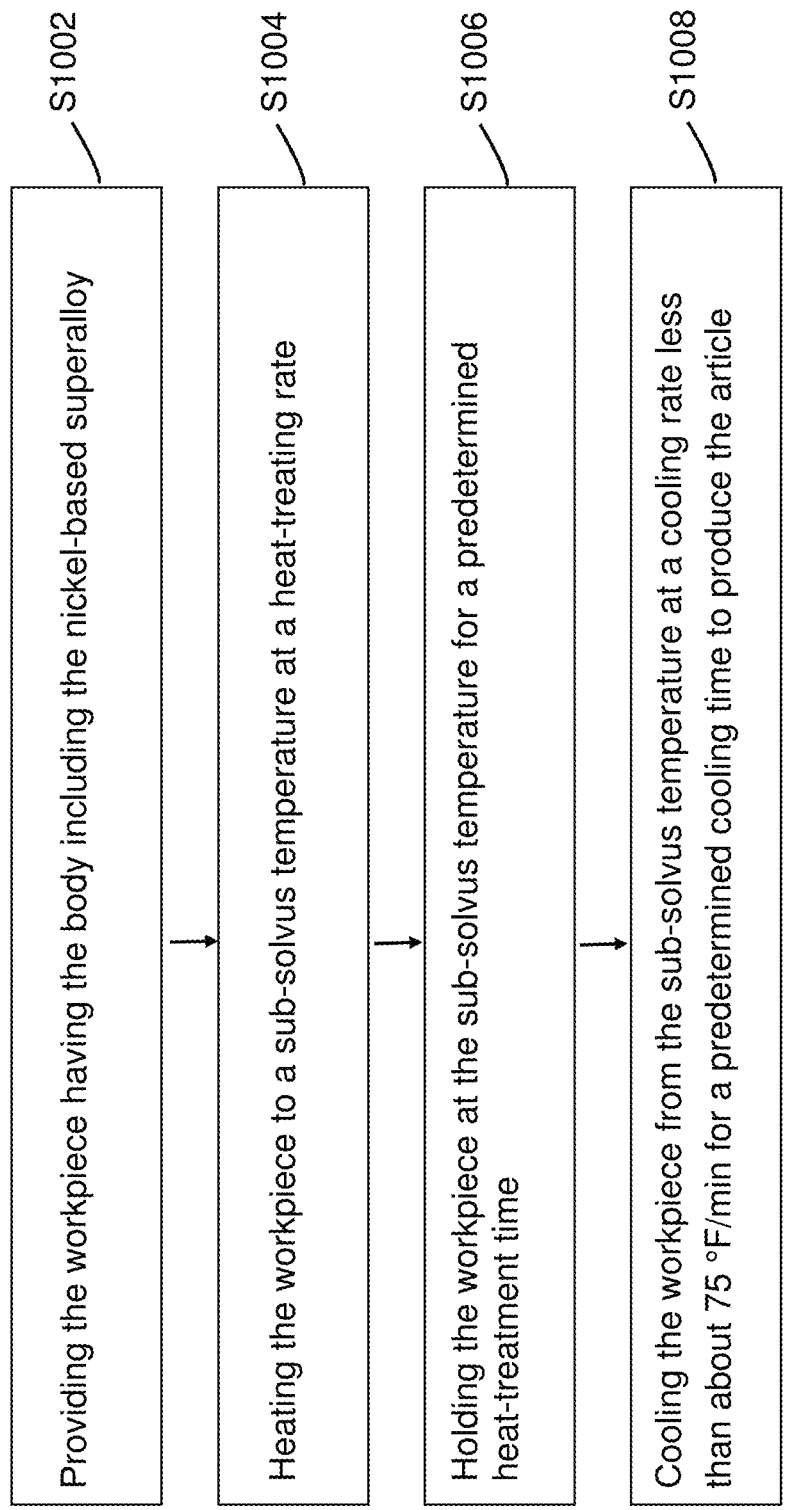
FIG. 12 is a flowchart showing a method for preparing an article from a workpiece having a body including a Ni-based superalloy, according to embodiments of the present disclosure.

FIG. 12 is a flowchart showing a method for preparing an article from a workpiece having a body including a Ni-based superalloy, according to embodiments of the present disclosure. In a non-limiting example, a method for preparing an article from a workpiece having a body including a nickel-based superalloy is provided. The method includes: providing the workpiece having the body including the nickel-based superalloy (S1002); heating the workpiece to a sub-solvus temperature at a heat-treating rate (S1004); holding the workpiece at the sub-solvus temperature for a predetermined heat-treatment time (S1006); and cooling the workpiece from the sub-solvus temperature at a cooling rate less than about 75° F./min for a predetermined cooling time to produce the article (S1008). In certain embodiments, the cooling rate may be less than about 75° F./min, less than about 65° F./min, less than about 55° F./min, less than 35° F./min, less than 25° F./min, less than about 20° F./min, or less than about 10° F./min, or in a range that including any two numerical values disclosed herein, e.g., in a range of about 10° F./min to about 20° F./min. As used herein and throughout the present disclosure, the sub-solvus temperature is a temperature below a γ' solvus temperature of the nickel-based superalloy. In embodiments, the method may further include controlling the cooling rate to be less than about 10° F./min.

The method may further include adjusting one or both of the heat-treating rate and the cooling rate to control a formation of a microstructure of the nickel-based superalloy including: a γ phase matrix, and a γ' phase including a plurality of rafting-resistant γ' particles dispersed in the γ phase matrix. The plurality of the rafting-resistant γ' particles may have an average perimeter of about 3.0 microns to about 15.0 microns, an average aspect ratio of about 1.2 to about 3.0, and where the microstructure of the nickel-based superalloy is substantially uniform throughout the body.

An article obtained in accordance with embodiments of the current disclosure may have a substantially uniform microstructure of the Ni-based superalloy across various sections of the body of the article, for example, an inner section, an outer section, and an intermediate section adjacent the inner and outer sections of the body dimension of the article prepared from the nickel-based superalloy.

In a non-limiting example, the process of the present disclosure may include: providing a workpiece having a nickel-based superalloy with a γ solvus temperature of about 2320 degrees Fahrenheit (° F.); heating the workpiece to below the γ' solvus temperature, at about 2220 degrees Fahrenheit (° F.) at a pre-determined heating rate, e.g., 25 degrees Fahrenheit/minute (° F./min) or higher; and after holding the workpiece at 2220° F. for about 2 hours, cooling the workpiece to below 1200° F. with a cooling rate of no greater than 75 degrees Fahrenheit/minute (° F./min). The temperature below γ solvus temperature may be in a range between about 2000° F. to about 2250° F., for the same nickel-based superalloy used in the conventional process above. In certain embodiments, the cooling rate may be less than about 75° F./min, less than about 65° F./min, less than about 55° F./min, less than about 35° F./min, less than about 25° F./min, less than about 20° F./min, or less than about 10° F./min, or in a range that including any two numerical values disclosed herein, e.g., in a range of about 10° F./min to about 20° F./min. It is to be understood that specific process parameters such as solvus temperature, heating rate and/or cooling rate may vary and may be dependent on compositions for each individual nickel-based superalloy. Such variations of process parameters are intended to be included within the scope of the present disclosure.

In embodiments, the providing step of the process as illustrated in FIG. 12 may further include providing the nickel-based superalloy including, by weight percent of the nickel-based superalloy, from about 4.0 weight percent to about 7.0 weight percent aluminum (Al), from about 5.0 weight percent to about 10.0 weight percent chromium (Cr), from about 6.0 weight percent to about 10.0 weight percent cobalt (Co), from 0 weight percent to about 1.5 weight percent hafnium (Hf), from 0 weight percent to about 4.0 weight percent molybdenum (Mo), from 0 weight percent to about 2.0 weight percent niobium (Nb), from 0 weight percent to about 6.0 weight percent rhenium (Re), about 4.0 weight percent to about 10.0 weight percent tantalum (Ta), from 0 weight percent to about 4.0 weight percent titanium (Ti), about 4.0 weight percent to about 8.0 weight percent tungsten (W), and the balance Ni and incidental impurities.

In certain embodiments, the rafting-resistant gamma prime phase is present in about 55 volume percent (% v/v) to about 75 volume percent (% v/v) of a total volume of the superalloy. In some embodiments, wherein the body has a weight of no less than about 15 pounds. In embodiments, the body has a weight in a range of about 15 pounds to about 55 pounds.

The term "workpiece", as used herein, refers to an initial article prepared from a starting material by solidification processing, for example investment casting by pouring liquid metal into a ceramic mold under vacuum followed by gradual solidification. The workpiece may be prepared by any now known or future developed techniques, for example by thermomechanical processes or powder metallurgy processing followed by mechanical working to provide a nickel-based superalloy as described herein.

In alternative embodiments, the nickel-based superalloy may be subjected to a solution heat followed by an aging heat treatment. The solution heat treatment may be a sub-solvus or a super-solvus solution heat treatment. Solution heat treatment may be carried out under a controlled heating and/or controlled cooling, in an argon atmosphere to minimize oxidation. During the super-solvus solution heat treatment, the γ' particles are dissolved, whilst in the case of the sub-solvus heat treatment, the γ' particles are pinned at grain boundaries, restricting grain growth.

It is to be understood that the representative method of preparing articles as illustrated herein is not intended to be limiting. Other methods and processes may be used to obtain the article from a workpiece having a body including a nickel-based superalloy with the specified properties. Such modifications and variations are intended to be included within the scope of the present disclosure.

The process of the present disclosure provides a novel Ni-based superalloy having a microstructure with a plurality of rafting-resistant γ' particles having controlled parameters. The rafting-resistant γ' particles have certain parameters controlled to be in a specified range, and the γ' phase is substantially free of rafting. The tunable parameters of γ' particles may include, but are not limited to, particle perimeter, aspect ratio, particle size, spacing between neighboring γ' particles, including average values of each specified parameter, or any combinations thereof. A substantially uniform morphology profile of the γ' phase may be achieved across various sections of the body dimension of the body of the article prepared from the nickel-based superalloy, which is advantageous for certain industrial components such as gas turbine blades weighed no less than 15 lbs. Furthermore, the goal of reducing crack growth is achieved while maintaining a high volume fraction of the strengthening γ' phase in the nickel-based superalloy.

The foregoing drawings show some of the processing associated according to several embodiments of the present disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "About," "approximately" and "substantially," when applied to a particular value(s) or a range including a starting and an ending values, unless otherwise dependent on the precision of the instrument measuring the value, may include +/−10% of the particular value(s) or the starting and ending values of the range.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. An article comprising:
   a body having a first side wall, a second side wall opposite to the first side wall, and a body dimension extending between the first side wall and the second side wall, the body further including a nickel-based superalloy having a microstructure that includes:
a gamma phase matrix, and
a gamma prime phase including a plurality of rafting-resistant gamma prime particles dispersed in the gamma phase matrix, wherein the plurality of the rafting-resistant gamma prime particles has an average particle perimeter of about 3.0 microns to about 15.0 microns, an average aspect ratio of about 1.2 to about 3.0, and wherein one or both of the average particle perimeter and the average aspect ratio of the plurality of rafting-resistant gamma prime particles have a measured value that is substantially uniform throughout the body dimension of the body.

2. The article of claim 1, wherein the body has a weight of no less than about 15 pounds.

3. The article of claim 1, wherein the body has a weight in a range of about 15 pounds to about 55 pounds.

4. The article of claim 1, wherein the gamma prime phase is present in about 55 volume percent (% v/v) to about 75 volume percent (% v/v) of the superalloy.

5. The article of claim 1, wherein the plurality of the rafting-resistant gamma prime particles has an average particle size of about 1.0 micron to about 6.0 microns.

6. The article of claim 1, wherein the nickel-based superalloy comprises a single crystal grain microstructure.

7. The article of claim 1, wherein the nickel-based superalloy includes from about 4.0 weight percent to about 7.0 weight percent aluminum (Al), from about 5.0 weight percent to about 10.0 weight percent chromium (Cr), from about 6.0 weight percent to about 10.0 weight percent cobalt (Co), from 0 weight percent to about 1.5 weight percent hafnium (Hf), from 0 weight percent to about 4.0 weight percent molybdenum (Mo), from 0 weight percent to about 2.0 weight percent niobium (Nb), from 0 weight percent to about 6.0 weight percent rhenium (Re), from about 4.0 weight percent to about 10.0 weight percent tantalum (Ta), from 0 weight percent to about 4.0 weight percent titanium (Ti), from about 4.0 weight percent to about 8.0 weight percent tungsten (W), and the balance Ni and incidental impurities.

8. The article of claim 1, wherein the nickel-based superalloy includes from about 4.0 weight percent to about 7.0 weight percent aluminum (Al), from about 5.0 weight percent to about 7.0 weight percent chromium (Cr), from about 6.5 weight percent to about 8.5 weight percent cobalt (Co), from 0 weight percent to about 0.2 weight percent hafnium (Hf), from about 1.0 weight percent to about 2.0 weight percent molybdenum (Mo), from 0 weight percent to about 3.5 weight percent rhenium (Re), from about 5.5 weight percent to about 7.5 weight percent tantalum (Ta), from about 5.0 weight percent to about 7.0 weight percent tungsten (W), and the balance Ni and incidental impurities.

9. The article of claim 1, wherein the body is a portion of a turbine component.

10. The article of claim 1, wherein the body is substantially free of cavities within the body dimension.

11. The article of claim 1, wherein the body dimension of the body includes an outer section, an inner section, and an intermediate section adjacent both the outer section and the inner section, and the body further includes a cooling passageway disposed within one or more of the outer section, the inner section, and the intermediate section.

* * * * *